US 6,619,837 B2

(12) United States Patent
Walls et al.

(10) Patent No.: US 6,619,837 B2
(45) Date of Patent: Sep. 16, 2003

(54) PROBE COVER WITH LUBRICATION WELL

(75) Inventors: James Walls, Sharon, MA (US); Loren Lantz, St. Charles, MO (US); Michael Kerwin, St. Louis, MO (US)

(73) Assignee: Sherwood Services AG, Schaffhausen (CH)

( * ) Notice: Subject to any disclaimer, the term of this patent is extended or adjusted under 35 U.S.C. 154(b) by 0 days.

(21) Appl. No.: 09/859,989

(22) Filed: May 17, 2001

(65) Prior Publication Data

US 2002/0172257 A1 Nov. 21, 2002

(51) Int. Cl.$^7$ .............................. G01K 1/08; A61B 5/00
(52) U.S. Cl. ...................... 374/158; 374/208; 600/549
(58) Field of Search ................................ 374/158, 209, 374/208, 183, 179; 600/549

(56) References Cited

U.S. PATENT DOCUMENTS

| 2,768,736 A | | 10/1956 | Govoni |
| 2,925,175 A | | 2/1960 | Diamant |
| 3,580,077 A | * | 5/1971 | Blackman .................. 600/549 |
| 3,681,991 A | * | 8/1972 | Eberly, Jr. .................. 374/158 |
| 3,987,899 A | | 10/1976 | Vyprachticky |
| 4,062,104 A | | 12/1977 | Carlsen |
| 4,117,926 A | | 10/1978 | Turner et al. |
| 4,136,776 A | | 1/1979 | Poncy |
| 4,141,951 A | | 2/1979 | Beckman |
| 4,142,631 A | | 3/1979 | Brandriff |
| 4,159,766 A | | 7/1979 | Kluge |
| 4,165,000 A | | 8/1979 | Poncy |
| 4,166,389 A | | 9/1979 | Montren |
| 4,341,992 A | | 7/1982 | Goldstein |
| 4,487,208 A | * | 12/1984 | Kamens ...................... 600/549 |
| 4,588,306 A | | 5/1986 | Burger et al. |
| 4,652,145 A | * | 3/1987 | Bjornberg .................. 374/158 |
| 4,662,360 A | * | 5/1987 | O'Hara et al. .............. 374/158 |
| 4,846,344 A | | 7/1989 | Bala |
| 5,318,029 A | * | 6/1994 | Palese ........................ 374/209 |
| 5,588,748 A | * | 12/1996 | Nomura et al. ............. 374/158 |
| 5,795,067 A | * | 8/1998 | Fraden et al. ............... 374/158 |
| 6,450,970 B1 | * | 9/2002 | Mahler et al. .............. 600/549 |

* cited by examiner

Primary Examiner—Diego Gutierrez
Assistant Examiner—Mirellys Jagan
(74) Attorney, Agent, or Firm—Ari M. Bai; Greensfelder, Hemker & Gale, P.C.

(57) ABSTRACT

A disposable, molded probe cover for use with an electronic thermometer is disclosed. The probe cover comprises an elongated hollow body made of a plastic material which defines a distal end and a proximal end. The distal end of the body has a convex-shaped surface that defines a lubrication well adapted to hold a lubricant therein, while the proximal end forms an opening. The opening communicates with a chamber that extends the entire length of the body and is sized and shaped to receive a probe of the electronic thermometer. To vent air trapped in the chamber during insertion of the probe into the probe cover, the chamber is provided with an axial ridge defined along a portion of the chamber for allowing air trapped at the distal end of the chamber to escape the probe cover through the electronic thermometer. A plurality of detents are also provided along the chamber proximate the opening for securely engaging the probe and establishing a fluid tight seal between the probe cover and the thermometer. When the probe cover is inserted into a patient body cavity, the lubricant spreads outwardly from the lubrication well and spreads over the exterior surface of the probe cover.

24 Claims, 6 Drawing Sheets

PROBE COVER WITH LUBRICATION WELL

BACKGROUND OF THE INVENTION

1. Field of the Invention

The present invention relates to thermometers, and particularly to probe covers for electronic thermometers. More specifically, the present invention relates to disposable, molded probe covers having high thermal conductivity.

2. Prior Art

The diagnosis and treatment of many body ailments depends upon a reliable indication of the internal temperature of a patient's body, and in some instances, upon comparison to a previous internal body temperature. Electronic thermometers have become a popular and accurate means of taking a person's internal body temperature. Typically, such electronic thermometers have a probe defining a probe tip which senses the internal body temperature when inserted either in the rectum or oral cavity of a person. For sanitary reasons, the probe is usually sheathed in a protective, disposable probe cover before being inserted into a patient's mouth or rectum. In many applications, it is desirable to have a probe cover made from a rigid or semi-rigid material, normally a conductive polymer, which is generally sized and shaped to fit over the probe. For the most part probes have a cylindrical shape with a generally spherical-shaped tip. In order to better conform the probe cover to the probe, the distal tip of the probe cover also has a generally spherical shape which conforms to the general shape of the probe tip. U.S. Pat. No. 4,341,992 to Goldstein discloses a typical prior art conductive probe cover having a spherical-shaped tip. However, the drawback with such a spherical shaped distal tip is that the rounded configuration of the probe cover has the potential of being uncomfortable when inserted into the patient's sub-lingual pocket due to the protruding profile presented by distal tip.

Another drawback with prior art probe covers is that there is no provision for supplying a lubricant to the probe cover which provides an adequate supply of lubricant when the probe of the thermometer is initially inserted into a person's rectum. Typically, a practitioner must manually spread the lubricant over the exterior surface of the probe cover prior to taking a temperature reading in the rectum. However, manually coating the exterior surface of the probe cover with lubricant does not provide enough lubricity to the distal tip of the probe cover sufficient to overcome the insertion force required to initially insert the probe cover into the rectum without causing increased discomfort to the patient.

Therefore, there is a need in the art for a probe cover that has a non-protruding distal tip that prevents jabbing or discomfort to the patient during insertion into a patient's body cavity when taking a temperature reading. There is a further need in the art for a probe cover that is configured to serve as a lubrication well adapted to receive a lubricant therein which provides additional lubricity to the probe cover during insertion of the probe into a person's body cavity.

OBJECTS AND SUMMARY OF THE INVENTION

The primary object of the present invention is to provide a probe cover for an electronic thermometer that has a distal tip with a convex-shaped configuration.

Another object of the present invention is to provide a probe cover that has a blunted tip configuration which reduces discomfort when residing in the sub-lingual pocket of a patient during the taking of an oral temperature.

A further object of the present invention is to provide a probe cover defining a tip that has a high thermal conductivity.

Yet another object of the present invention is to provide a probe cover having a distal tip which has a reduced wall thickness relative to the rest of the probe cover.

Another further object of the present invention is to provide a probe cover having a lubrication well adapted to receive a lubricant that automatically spreads and coats the exterior surface of the probe cover during insertion of the thermometer probe into a patient's body cavity.

Yet another object of the present invention is to provide a probe cover made of a high thermal conductivity material.

Yet another further object of the present invention is to provide a probe cover which fits tightly over the probe in order to enhance thermal conduction and improve thermal response time.

In brief summary, the present invention overcomes and substantially alleviates the deficiencies present in the art by providing a probe cover having a convex shaped distal tip that defines a lubrication well for receiving a lubricant therein.

Preferably, the probe cover for an electronic thermometer according to the present invention comprises an elongated hollow body defining a distal end and a proximal end. The distal end of the body has a convex-shaped surface that defines a lubrication well adapted to receive a lubricant therein, while the proximal end forms an opening. The opening communicates with a chamber that extends substantially the entire length of the body and is sized and shaped to receive a probe of the electronic thermometer. To vent air trapped in the chamber during insertion of the probe into the probe cover, the interior surface defines an axial ridge along a portion thereof for allowing air trapped at the distal end of the chamber to escape through a vent area formed between the probe cover and the probe by the ridge. A plurality of detents are also provided along the chamber proximate the opening for securely engaging the probe in an interference fit between the probe cover and the probe of the thermometer.

In use, the probe cover is inserted over the probe of the electronic thermometer until the detents securely engage the proximal end of the probe. A sterile lubricant is then applied to the lubrication well by the practitioner to aid initial insertion into a patient's body cavity, for example, the rectum. As the practitioner inserts the probe into the patient's body cavity, the lubricant is caused to spread outwardly from the lubrication well and coat the exterior surface of the probe cover. The practitioner then takes the core body temperature of the patient and removes the probe from the patient's cavity. Once the probe is withdrawn, the probe cover may be removed from the probe and disposed of by the practitioner.

These and other objects of the present invention are realized in the preferred embodiment, described by way of example and not by way of limitation, which provides for a probe cover for an electronic thermometer having a lubrication well.

Additional objects, advantages and novel features of the invention will be set forth in the description which follows, and will become apparent to those skilled in the art upon examination of the following more detailed description and drawings in which like elements of the invention are similarly numbered throughout.

DETAILED DESCRIPTION OF THE INVENTION

Figure 1:
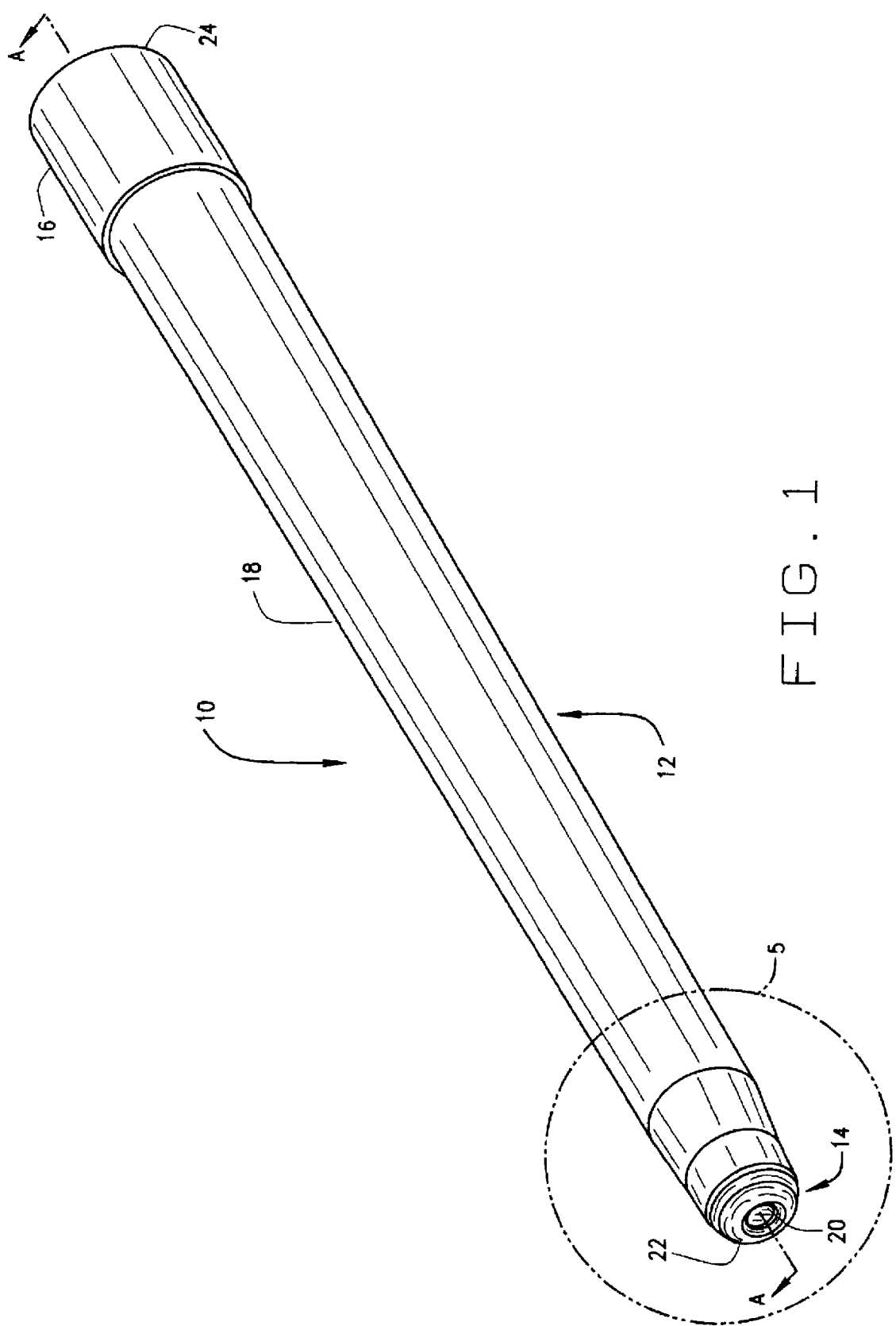
FIG. 1 is a perspective view of the probe cover according to the present invention.
Figure 2:
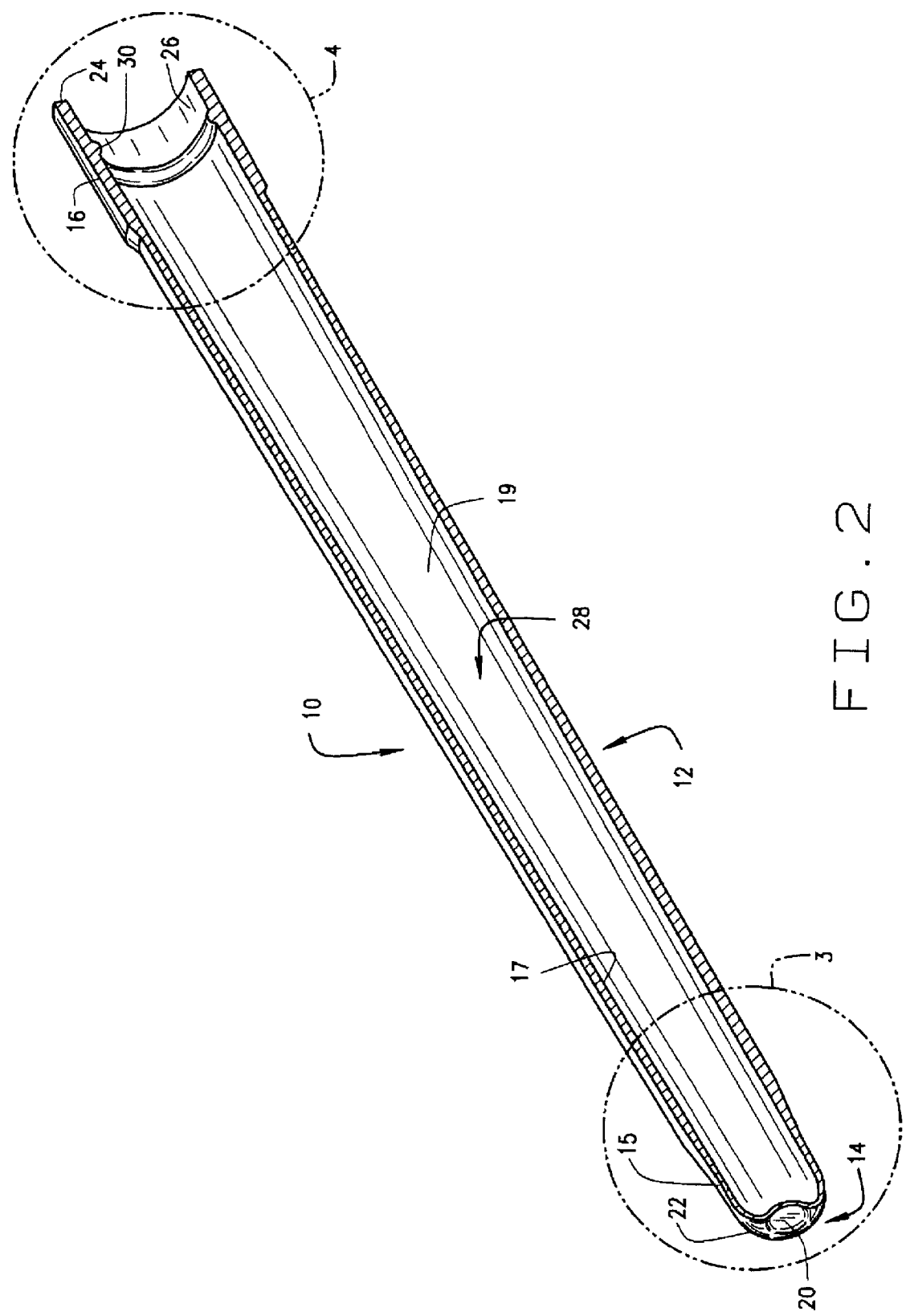
FIG. 2 is cross-sectional view of the probe cover taken along line A—A of FIG. 1 according to the present invention.
Figure 6:
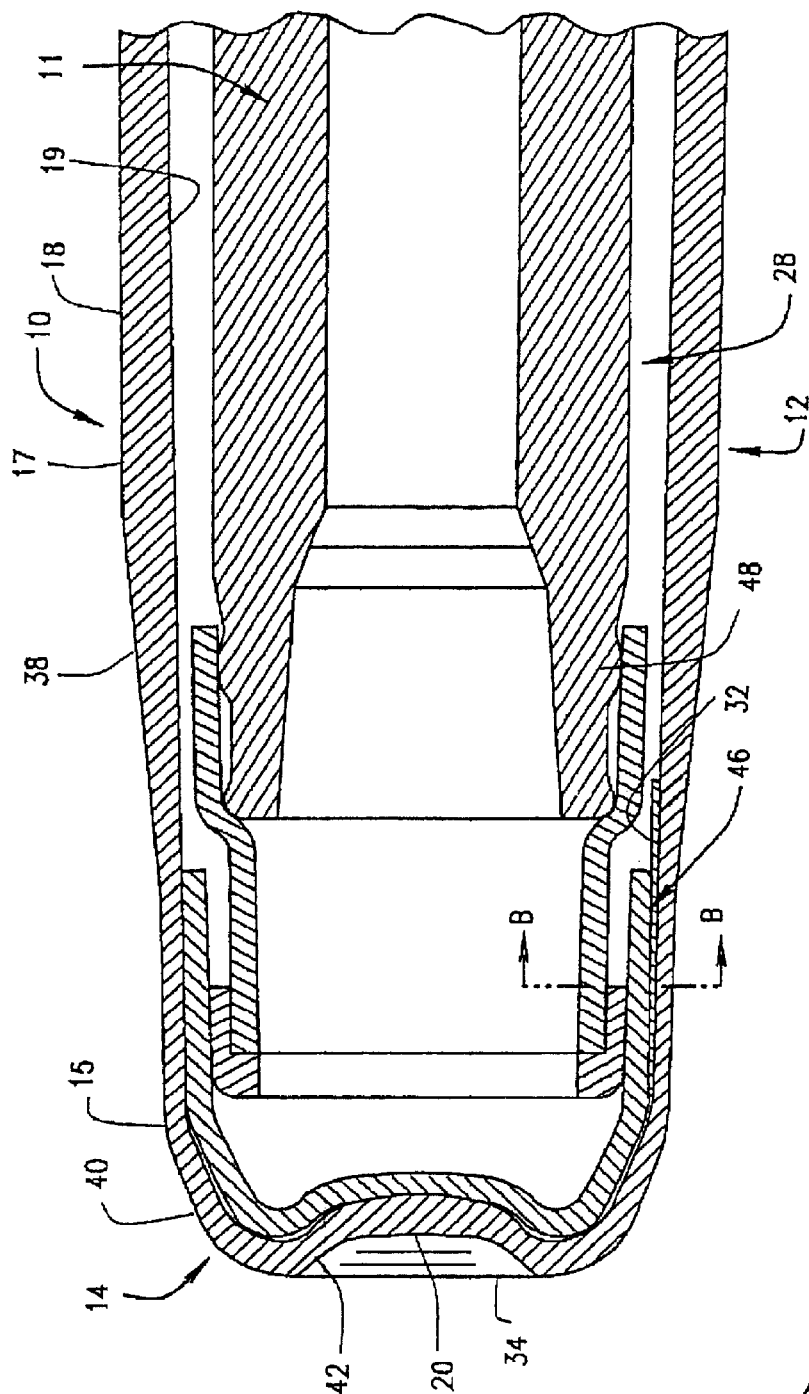
FIG. 6 is a cross sectional view illustrating the probe cover inserted over a probe of an electronic thermometer according to the present invention.

Referring to the drawings, the preferred embodiment of the probe cover of the present invention is illustrated and generally indicated as 10 in FIG. 1. Probe cover 10 is made from a molded injection process well known in the art and is adapted to cover a probe 48 of an electronic thermometer 11 (FIG. 6). As further shown, probe cover 10 comprises a hollow elongated body 12 having a thin wall 15 and a thick wall 17 that define a textured exterior surface 18 and an interior surface 19 (FIG. 2). Elongated body 12 further defines a distal end 22 and a proximal end 24. The distal end 22 includes a distal tip 14 defining a convex-shaped lubrication well 20, while the proximal end forms a flange 16 proximate an opening 26 (FIG. 2).

Figure 3:
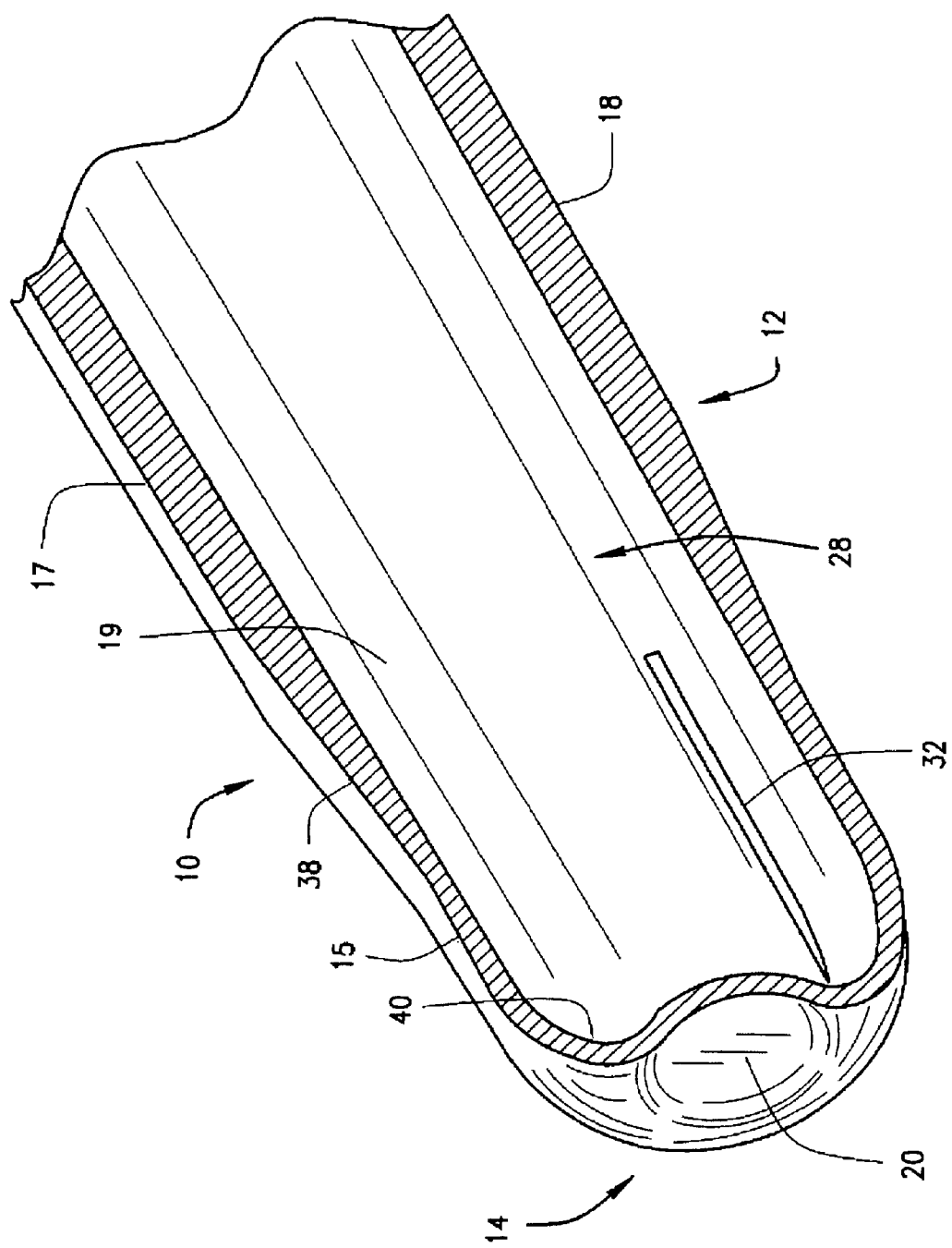
FIG. 3 is an enlarged cross-sectional view of the probe cover of FIG. 2 according to the present invention.

Referring to FIG. 2, the opening 26 at the proximal end 24 of probe cover 10 communicates with a chamber 28 formed along the interior surface 19. Chamber 28 has a generally cylindrical configuration which is sized and shaped to receive the probe 48 of thermometer 11 as shall be discussed in greater detail below. As illustrated in FIGS. 2 and 3, the lubrication well 20 has a generally convex-shaped configuration which is adapted to receive a predetermined amount of a sterile lubricant 34 (FIG. 6) therein by a practitioner prior to insertion of the probe 48 into the body cavity (not shown) of a patient. The convexity of the lubrication well 20 also provides a generally non-protruding profile that presents a blunted profile which reduces or eliminates the general discomfort to a patient during insertion of the probe 48 into a patient's body cavity as distinguished from prior art probe covers which have a generally spherical and protruding shape.

Figure 7:
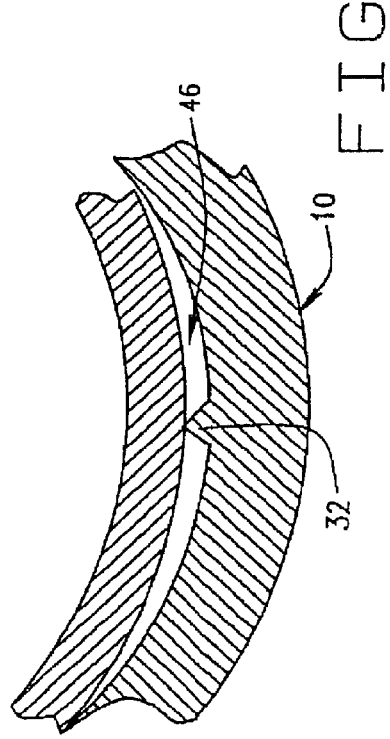
FIG. 7 is a cross sectional view of the probe cover inserted cover the probe taken along line B—B of FIG. 6 according to the present invention.

Referring to FIG. 3, thick wall 17 transitions into thin wall 15 along a tapered portion 38 that defines a portion of distal tip 14. The portion of thin wall 15 which includes lubrication well 20 defines a ridge section 40 formed adjacent a well section 42 adapted to receive lubricant 34 therein. To permit air to vent from the portion of chamber 28 along distal tip 14 during insertion of probe cover 10 over probe 48, an axial raised ridge 32 is provided along interior surface 19. As shown in FIGS. 6 and 7, raised ridge 32 provides a vent area 46 which permits air trapped between probe 48 and probe cover 10 to escape from the distal end 22 of probe cover 10. Although the preferred embodiment of the present invention contemplates a raised ridge 32, in the alternative air may be vented using a longitudinal groove formed along the interior surface 19 of probe cover 10.

Figure 4:
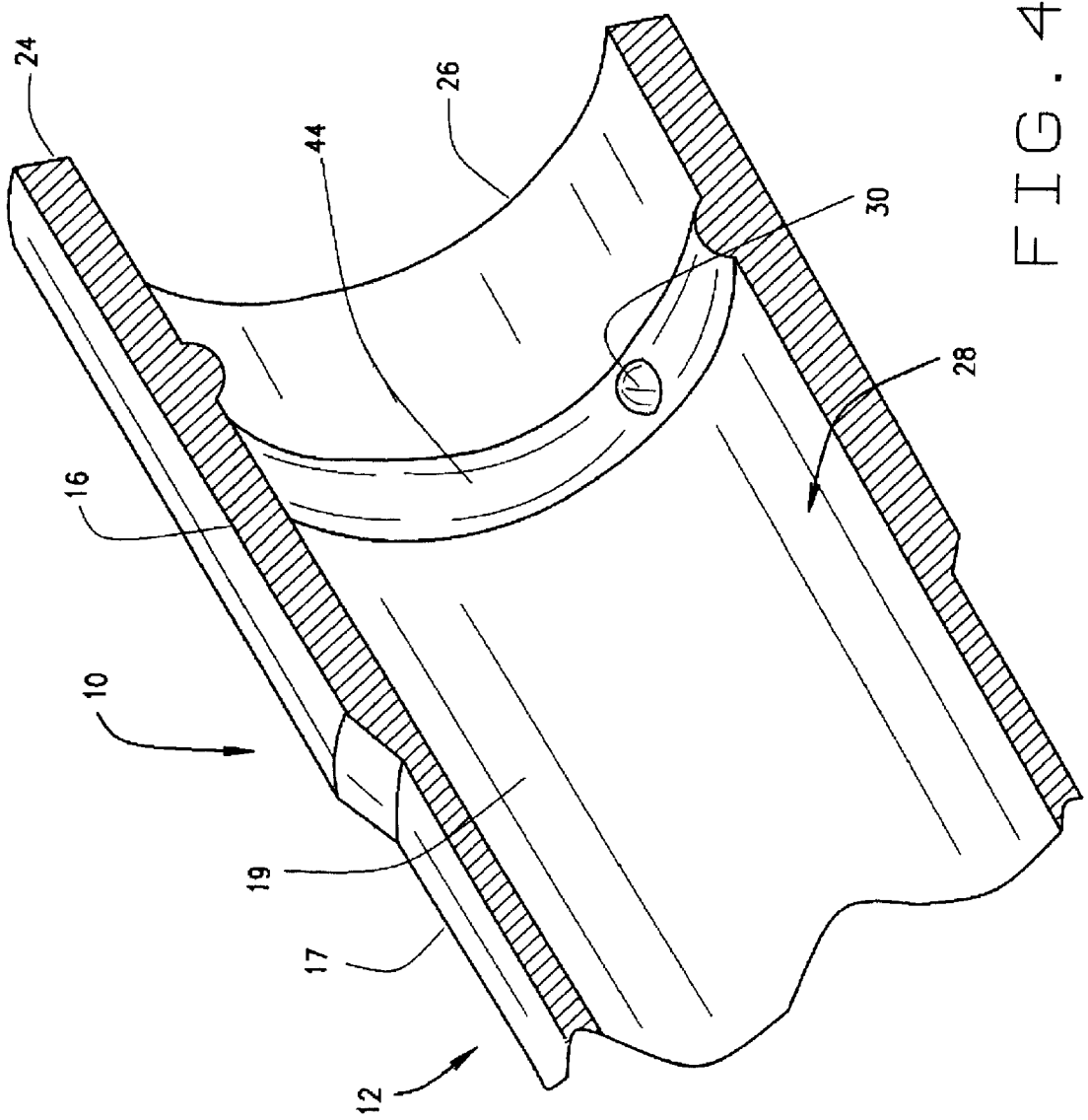
FIG. 4 is an enlarged cross-sectional view of the probe cover of FIG. 2 according to the present invention.
Figure 5:
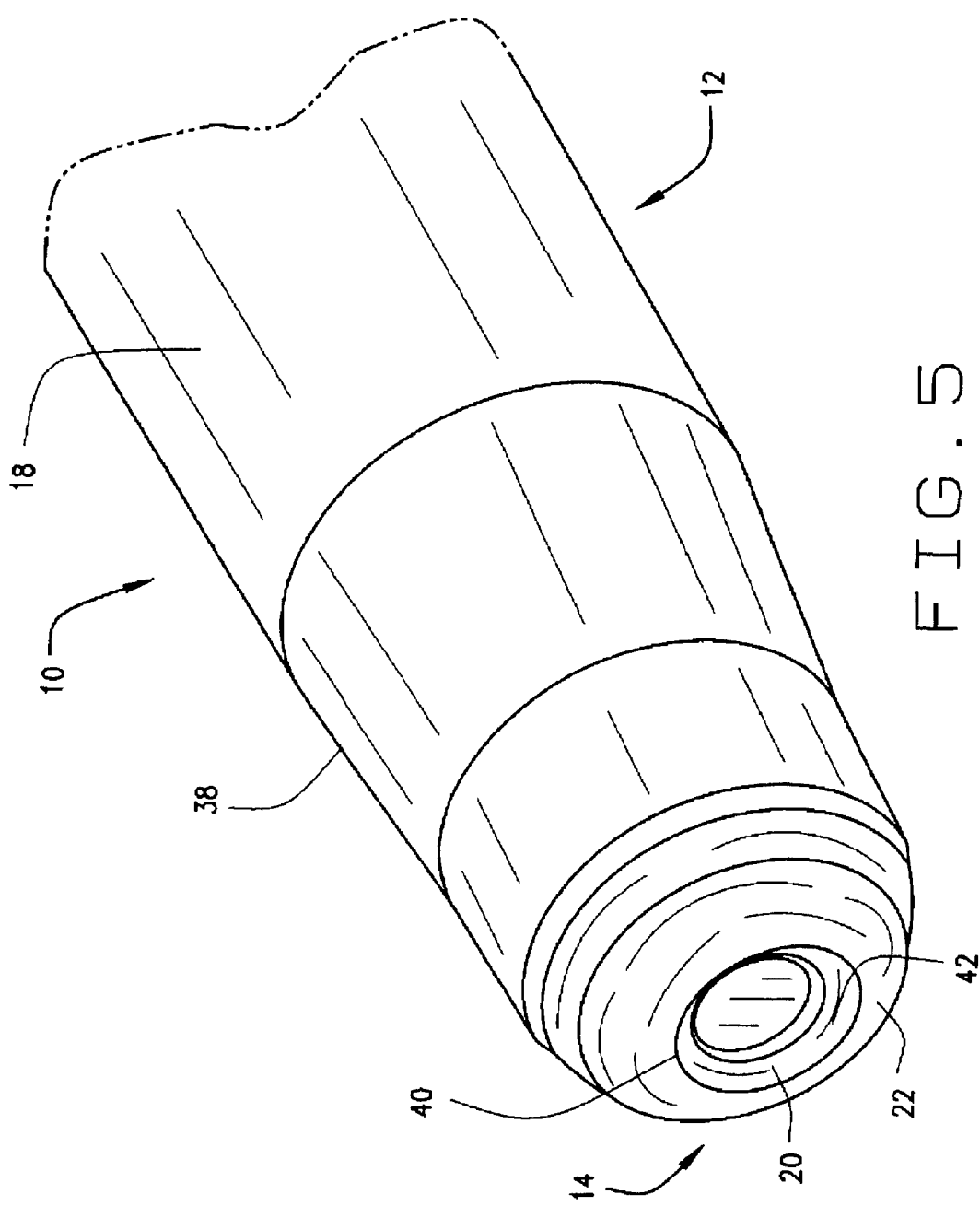
FIG. 5 is an enlarged perspective view of the probe cover of FIG. 1 according to the present invention.

Referring to FIG. 4, a ridge 44 is formed around the inner circumference of chamber 28 for engaging probe 48. To accomplish this engagement, ridge 44 is provided with a plurality of detents 30 for engaging probe 48. Preferably, ridge 44 has three detents 30 spaced apart equidistantly at 120° which are sized and shaped to engage probe 48 in an interference fit that provides a secure engagement between the probe 48 and probe cover 10. Although in the present embodiment probe cover 10 is provided with three detents 30, the present invention contemplates that any plurality of detents 30 may be provided and fall within the spirit and scope of the present invention.

In operation, the practitioner inserts probe cover 10 over probe 48 of electronic thermometer 11 until a secure engagement is achieved. The practitioner then supplies an amount of lubricant 34 inside the lubrication well 20 and the exterior surface 18. The probe 48 is then inserted into the body cavity of a patient (not shown), such as the rectum. As the practitioner inserts the probe 48 into the patient's body cavity the lubricant 34 is caused to spread outwardly from the lubrication well 20 as the tissue of the patient contacts probe cover 10 and automatically coats probe cover 10. The lubricant 34 from the lubrication well 34 provides additional lubricity to probe cover 10 sufficient to overcome the insertion force required to initially insert probe cover 10 into the rectum without causing increased discomfort to the patient. Although the method described herein describes the probe cover 10 being inserted into the rectum, the present invention contemplates that the probe cover 10 may be inserted in the oral cavity or the arm pit of a patient when taking a temperature reading. Once a temperature reading is taken, the practitioner withdraws the probe 48 and ejects the probe cover 10.

Preferably, the mean thickness of thin wall 15 is approximately 0.01 inches, while the thick wall 17 mean thickness is approximately 0.02 inches. However, any mean wall thickness suitable for high thermal conductivity of thin wall 15 is felt to fall within the spirit and scope of the present invention.

In the preferred embodiment, probe cover 10 is made of a single material, such as high density polyethylene, which has a thermal conductivity that is 1.5 to 4 times that of commonly used polymers having similar mechanical properties in their natural (unfilled, uncovered) state. Preferably, the single material may also have a small amount of colorant or additive well known in the art which enhances the thermal conductivity of probe cover 10. In an alternative embodiment, probe cover 10 is made of at least two different materials, each tailored to the specific physical, thermal, and mechanical requirements of the thin and thick walls 15 and 17, respectively. The thin wall 15 may be manufactured of a polymer containing a high thermal conductivity filler to further enhance heat transfer through tip 14. On the other hand, thick wall 17 may be manufactured using a low thermal conductivity material that will resist the flow of heat energy and can be reliably bonded to distal tip 14.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

We claim:

1. A probe cover for a thermometer comprising:
   a unitary hollow body, said body having a distal end and a proximal end, said distal end forming a closed tip and said proximal end defining an opening in communication with a chamber formed through said body, said closed tip defining a lubrication well, wherein a lubricant is pre-positioned in said lubrication well.

2. A probe cover for a thermometer comprising:
a unitary hollow body, said body defining having a distal end and a proximal end, said distal end defining a closed distal tip and said proximal end forming an opening, said opening communicating with a chamber formed inside said body, said closed distal tip having a convex-shaped configuration defining a well, wherein a lubricant is pre-positioned inside said well.

3. A probe cover for a thermometer comprising:
a unitary hollow body, said body having a wall defining an interior surface and an exterior surface, said interior surface defining a chamber, said exterior surface defining a closed tip at one end of said body and an opening in communication with said chamber at the other end of said body, said closed tip defining a lubrication well, wherein a lubricant is pre-positioned in said well.

4. The probe cover according to claim 3, wherein said lubricant spreads outwardly from said lubrication well to coat said exterior surface when said probe cover is inserted into a body cavity of a patient.

5. The probe cover according to claim 3, wherein said lubrication well has a generally convex shape.

6. The probe cover according to claim 3, wherein said chamber is adapted to receive a probe of a thermometer through said opening.

7. The probe cover according to claim 3, wherein said body is made from a thermally conductive material.

8. The probe cover according to claim 3, wherein said body is made from a plastic material.

9. The probe cover according to claim 3, wherein said lubrication well provides a non-protruding profile.

10. The probe cover according to claim 3, wherein said interior surface defines a raised ridge, said raised ridge permitting air to vent from said tip.

11. The probe cover according to claim 3, wherein said interior surface defines a groove, said groove permitting air to vent from said tip.

12. The probe cover according to claim 3, wherein said body comprises thick wall and a thin wall having decreased thickness relative to said thick wall.

13. The probe cover according to claim 12, wherein the mean thickness of said thin wall is 0.01 inches.

14. A probe cover in combination with a thermometer comprising:
a probe cover having a unitary hollow body, said unitary body having a wall defining an interior surface and an exterior surface, said interior surface forming a chamber, said, exterior surface defining a closed tip at one end of said unitary body and an opening in communication with said chamber at the other end of said body, said tip defining a well, wherein a lubricant is pre-postioned in said well; and
a probe for sensing a body temperature, said probe being insertable within said chamber of said probe cover for encapsulating said probe.

15. The combination according to claim 14, wherein said well has a generally convex shape.

16. The combination according to claim 14, wherein said well is sized and shaped to receive a lubricant therein.

17. The combination according to claim 14, wherein said body further defines a proximal end, said body having a flange formed adjacent said proximal end.

18. The combination according to claim 14 wherein said tip is of a decreased wall thickness relative to the rest of said unitary body.

19. The combination according to claim 14, wherein said probe cover provides an interference fit with said probe.

20. The combination according to claim 14, wherein said chamber defines a plurality of detents.

21. The combination according to claim 20, wherein said plurality of detents are adapted to securely engage said probe of said thermometer.

22. A method for inserting a thermometer inside a body cavity comprising the steps of:
a) providing a probe cover having a unitary hollow body, said unitary body having a wall defining an interior surface and an exterior surface, said interior surface forming a chamber, said exterior surface defining a closed tip at one end of said body and an opening in communication with said chamber at the other end of said body said closed tip forming a well;
b) providing a thermometer having a probe;
c) inserting said probe into said chamber of said probe cover until said probe is encapsulated inside said probe cover;
d) pre-positioning a lubricant in said well;
e) inserting said probe cover into the body cavity; and
f) taking a temperature.

23. The method according to claim. 22, wherein inserting said probe cover into the body cavity causes said pre-positioned lubricant to spread outwardly from said well and cover said probe cover.

24. The method according to claim 22, wherein inserting said probe into said chamber of said probe cover provides an interference fit between said probe and said probe cover.

* * * * *

UNITED STATES PATENT AND TRADEMARK OFFICE
CERTIFICATE OF CORRECTION

PATENT NO. : 6,619,837 B2
DATED : September 16, 2003
INVENTOR(S) : James Walls et al.

It is certified that error appears in the above-identified patent and that said Letters Patent is hereby corrected as shown below:

<u>Title page</u>,
Item [75], Inventors, correct to read as follows:
-- James Walls, Sharon, MA (US); Loren Lantz, St. Charles, MO (US), Michael Kerwin, St. Louis, MO (US); Glenn G. Fournie, Smithton, IL (US); Mark A. Davis, St. Paul, MO (US). --

Signed and Sealed this

Ninth Day of March, 2004

JON W. DUDAS
*Acting Director of the United States Patent and Trademark Office*